Sept. 29, 1959     D. S. BUNCE     2,906,255
VALVE STEM SEAL
Filed June 16, 1958
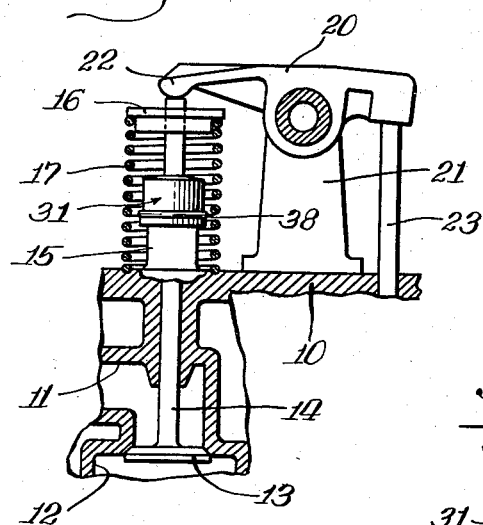
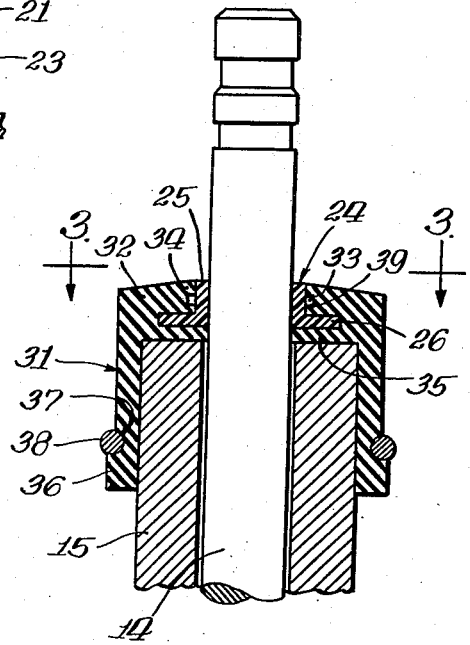
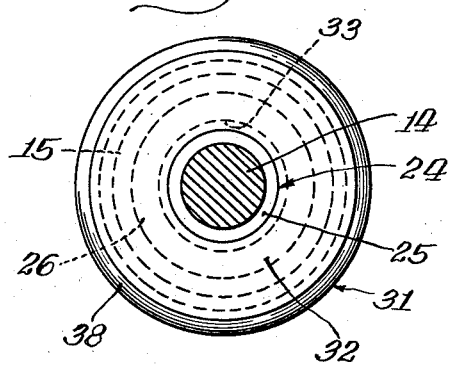
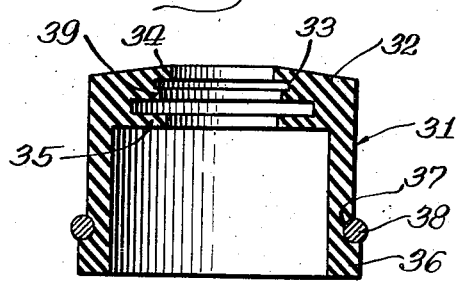
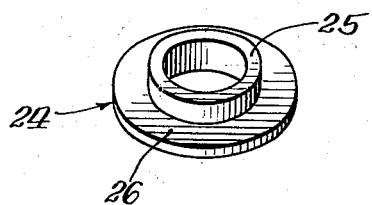
INVENTOR.
Dean S. Bunce,
BY
Davis, Lindsey, Hibben & Noyes
Attys.

2,906,255
Patented Sept. 29, 1959

2,906,255
VALVE STEM SEAL

Dean S. Bunce, Hagerstown, Ind., assignor to Perfect Circle Corporation, Hagerstown, Ind., a corporation of Indiana Application June 16, 1958, Serial No. 742,142

9 Claims. (Cl. 123—188)

The invention relates to a seal for the stem of a valve for an internal combustion engine.

In internal combustion engines, the intake and exhaust valves are cam operated through rocker arms in the case of an overhead valve engine or through plungers in the case of an L-head engine. Each valve comprises a valve head and a stem reciprocably mounted in a guide, with the end of the stem engaged by the rocker arm or plunger, as the case may be. The guide may be an integral part of the cylinder head or cylinder block, or may comprise a separate member fitted in the cylinder head or cylinder block. In the case of the overhead valve engine, oil is usually supplied through the rocker arm to the point of contact with the end of the valve stem, and the oil runs along the stem to lubricate the guide. As wear occurs in the guide or on the stem, the oil tends to work through the guide to the head of the valve where it may be drawn into the combustion chamber portion of the cylinder and head in the case of an intake valve, or will be contacted by the hot exhaust gases in the case of an exhaust valve. In either instance, the oil will be burned, causing smoke in the exhaust, as well as a waste of oil. Similar conditions will occur in the case of an L-head engine.

The general object of the present invention is to provide a novel seal for the stem of a valve to prevent excess oil from entering the valve stem guide.

More specifically, the object is to provide a novel valve stem seal which closely embraces the valve stem and which is made of a material tending to reduce capillary flow along the stem.

Another object is to provide a novel valve stem seal which is inexpensive to manufacture, may be easily installed, effectively prevents the passage of excess oil, and remains effective for a long period of time.

Other objects and advantages will become apparent from the following description taken in connection with the accompanying drawing, in which:

Fig. 1 is a fragmentary elevational view, partly in section, of a valve operating mechanism of an internal combustion engine, with the stem of the valve provided with a seal embodying the features of the invention;

Fig. 2 is an enlarged longitudinal sectional view of the seal illustrated in Fig. 1 and showing it mounted on a valve stem and valve stem guide;

Fig. 3 is a transverse sectional view of the seal and stem taken on the line 3—3 of Fig. 2;

Fig. 4 is a longitudinal sectional view of one of the parts of the seal before being assembled with the other part; and Fig. 5 is a perspective view of said other part of the seal.

For purposes of illustration, I have shown a seal embodying the features of the invention, in connection with an engine of the overhead valve type. In Fig. 1 of the drawing, a fragmentary portion of such an engine is shown. Thus, the cylinder head of the engine is partially illustrated in section at 10. The head is shown as being provided with a passage 11 communicating with the combustion chamber fragmentarily shown at 12, the opening of the passage 11 into the combustion chamber 12 being controlled by a valve comprising the usual valve head 13 formed on one end of a stem 14. The latter extends through the cylinder head 10 and is reciprocably supported by a guide 15, which is generally cylindrical and which in this instance is shown as being integral with the cylinder head. The guide 15, of course, may be of the character shown or may comprise a separate member rigidly secured in the cylinder head, as heretofore mentioned.

The valve stem 14 extends upwardly beyond the guide 15 at its upper end and is usually provided with a plate 16 engaged by one end of a coil spring 17, the other end of the spring being shown as seated on the cylinder head. The spring thus tends to move the valve head 13 to a closed position. For opening the valve, a rocker arm 20 is shown as rockably mounted on a bracket 21 extending upwardly from the cylinder head, with one end 22 engaging the upper end of the valve stem 14. To operate the rocker arm 20, the other end thereof is shown as engaged by a push rod 23 which is operated by engine-driven cam means (not shown). The valve described is illustrative of either an intake valve or an exhaust valve.

To lubricate the rocker arm, oil is usually supplied to the rocker support and a passage is provided in the rocker arm for conducting oil to the end 22 of the rocker arm to lubricate its contact with the upper end of the valve stem 14. The oil therefrom then runs downwardly on the stem and provides lubrication for the valve stem guide 15. If the guide 15 has an excess clearance with the valve stem or such excess clearance is present after wear, the oil will continue to travel downwardly on the valve stem 14 until it reaches the valve head 13. If the valve is an intake valve, the oil will be drawn into the combustion chamber and will be burned therein, resulting in smoke in the exhaust. If the valve is an exhaust valve, the hot gases discharged from the combustion space will effect burning of the oil and will likewise result in smoke in the exhaust.

A seal embodying the features of the invention is adapted to be mounted on the valve stem 14 at the upper end of the valve stem guide 15 and is constructed to prevent excess oil from running down the valve stem into the guide, even when the guide becomes worn, but permitting sufficient oil to pass therethrough to properly lubricate the guide and stem. Generally the seal comprises a collar adapted to embrace the valve stem at the upper end of the guide, and a resilient cup-shaped member fitting over the collar and resiliently gripping the upper end portion of the guide to hold the collar in place.

As illustrated in the drawing, the seal is shown as comprising a collar, indicated generally at 24, made of resilient plastic material and comprising, in this instance, a cylindrical portion 25 having an internal diameter slightly less than the diameter of the stem 14 so that it hugs the stem. The collar 24 also includes a flange 26 at the lower end of the cylindrical portion 25.

The collar 24 is held in place at the end of the valve guide 15 by a resilient cup-shaped member, indicated generally at 31, preferably made of rubber or rubber-like material such as Buna N. The cup-shaped member 31 is in an inverted position and includes a centrally apertured transverse wall 32. The cylindrical portion 25 is positioned in the aperture in the wall 32 and the flange 26 is embedded in the wall 32. The embedding of the flange 26 in the wall 32 thus holds the collar 24 against movement with the valve stem longitudinally thereof. The upper surface of the wall 32 preferably is substantially flush with or slightly below the upper end of the cylindrical portion 25 to avoid forming a pocket about the stem, which would tend to collect a pool of oil at that point. To insure having the wall 32 tightly grip the cylindrical portion 25 at the upper end thereof as well as adjacent the flange 26 of the collar to prevent leakage of oil therebetween, a clearance is provided in the wall 32, in the form of a groove 33. The wall 32 thus has a flange 34 at its top, extending inwardly and of slightly smaller diameter than the diameter of the cylindrical portion 25 to tightly grip the latter. The groove 33 also provides a flange 39 overlying the flange 26 of the collar and tightly gripping the cylindrical portion 25. Thus, no oil can pass between the collar 24 and the cup-shaped member 31. The wall 32 further has an internal lip portion 35 underlying the flange 26 of the collar to engage the end of the guide 15 and form a seal therewith.

The cup-shaped member 31 has a cylindrical wall adapted to fit over and frictionally grip the upper end of the guide 15, and to this end, the member has an inner diameter somewhat less than the diameter of the guide 15 so that it must be stretched when placed on the valve guide 15. It thus hugs the valve guide tightly and will be retained thereon. The member 31 may be provided with an annular external rib 36 at its lower end to assist in the gripping action. As a further means for effecting a tight gripping action, the cup-shaped member may be provided with an external groove 37 adjacent the rib 36 to receive a metal snap ring 38 firmly holding the member 31 on the guide 15. The collar 24 is thus held on the valve stem 14 adjacent the upper end of the guide 15 and is prevented from reciprocating with the valve stem. However, since the member 31 is made of yieldable material, it can accommodate any eccentricity between the exterior of the guide and the valve stem and any out-of-roundness of the guide without affecting the proper functioning of the collar 24.

The resilient plastic material, of which the collar 24 is made, is such that it tends to reduce capillary flow of oil between the stem and the collar. This is accomplished by using a material which cannot be "wet" by the usual lubricating oil used in internal combustion engines. The tight fit of the collar 24 about the stem and the non-wetting characteristic of the material thus prevents excess flow of oil along the stem through the guide, sufficient oil passing through the seal, however, to lubricate the guide. The resinous material used is selected from the group consisting of tetrafluoroethylene polymers, commonly known as "Teflon," and trifluorochloroethylene polymers, commonly known as "Kel-F," and has the characteristics desired. Moreover, it may be readily molded in the shape herein shown. While the collar 24 may be made of either of these materials, Teflon is preferred since it may be more readily stretched for positioning on the valve stem and hence can accommodate a greater variation in valve stem diameter. Teflon also has the non-wetting characteristic to a somewhat greater degree than the Kel-F. However, both of the materials have been found satisfactory for the purposes intended.

Another advantage, related to the non-wetting characteristic of these materials, has been noted in the present instance. Thus, with either of these materials, it is found that there is a tendency for some of the material of the collar 24 to rub off slightly onto the valve stem so that the stem is likewise rendered non-wettable by oil. Consequently the opposing surfaces of the collar and the stem are both non-wettable by oil and the flow of oil therebetween is held to a minimum. The non-wetting characteristic of either of these materials also prevents oil from passing between the cup-shaped member 31 and the collar 24. The material further acts as a heat insulator to prevent conduction of heat from the valve stem to the member 31, thereby preventing deterioration of the member 31 from heat.

The seal disclosed herein is of particular advantage in the newer high-compression, overhead valve engines. In such engines, a higher vacuum occurs on the intake stroke and hence a tendency to draw oil inwardly along the valve stem. On the exhaust stroke, an aspirating action may occur, which would also tend to draw oil inwardly along the valve stem. The present seal prevents such flow of oil.

The present seal also has advantages when the valve guide becomes worn. It has heretofore been the practice, when guides become worn, to ream the guides and install valves with over-sized stems, to prevent undesired flow of oil through the guide. With the present seal, much greater wear in the guides can be tolerated, before reaming and installation of new valves, than was heretofore considered practical. The seal, in addition to preventing flow of oil through the guide when worn, may also prevent air being drawn in through the guide in the case of an intake valve, which air might upset the normal fuel-air ratio of the engine. In the case of an exhaust valve where the guide is worn, the seal may prevent leakage of exhaust gases through the guide.

I claim:

1. A valve stem seal adapted to be mounted on a cylindrical valve stem guide at the end of the latter, comprising a collar made of resilient plastic material adapted to tightly embrace the valve stem adjacent the end of the guide, and resilient plastic means having a cylindrical wall adapted to resiliently and frictionally embrace the end portion of the guide for holding said collar in place at the cylindrical end of the guide.

2. A valve stem seal according to claim 1, in which said material is a resinous material selected from the group consisting of tetrafluoroethylene polymers and trifluorochloroethylene polymers.

3. A valve stem seal according to claim 1, in which said material is a tetrafluoroethylene polymer and is non-wettable by oil and thereby tends to prevent flow of oil between said collar and the valve stem.

4. A valve stem seal according to claim 1, in which said material is non-wettable by oil, said material tending to slightly rub off onto the valve stem and thereby tending to render it likewise non-wettable by oil, to reduce flow of oil between said collar and the valve stem.

5. A valve stem seal adapted to be mounted on a valve stem guide at the end of the latter, comprising a collar made of resilient plastic material and having a generally cylindrical portion adapted to tightly embrace the valve stem adjacent the end of the guide and a flange portion at the lower end of said cylindrical portion, and a resilient inverted cup-shaped member having its transverse wall centrally apertured and tightly embracing said cylindrical portion with said flange portion embedded therein, the side wall of said member being adapted to embrace and grip the guide, the upper surface of said transverse wall being substantially flush with or below the upper end of said cylindrical portion to avoid forming a pocket about the stem tending to collect oil.

6. A valve stem seal according to claim 5, in which said transverse wall has a flange at the upper end of the aperture therethrough, extending inwardly with an internal diameter slightly less than said cylindrical portion, said flange being stretched by and tightly gripping said cylindrical portion to prevent leakage of oil between said collar and said cup-shaped member.

7. A valve stem seal according to claim 6, in which said transverse wall has a second inwardly extending flange spaced below said first-mentioned flange of said member, said second flange overlying the flange on said collar and tightly gripping the cylindrical portion of said collar.

8. A valve stem seal adapted to be mounted on a valve stem guide at the end of the latter, comprising a collar made of resilient plastic material and having a generally cylindrical portion adapted to tightly embrace the valve stem adjacent the end of the guide and a flange portion at the lower end of said cylindrical portion, and a resilient inverted cup-shaped member having its transverse wall centrally apertured and tightly embracing said cylindrical portion, the side wall of said member being adapted to embrace and grip the guide, said flange portion being embedded in said transverse wall to hold said collar against movement with said stem longitudinally thereof.

9. A valve stem seal according to claim 7, in which said transverse wall has a lip portion underlying said flange portion of the collar and adapted to engage and seal against the end of the guide.

References Cited in the file of this patent

UNITED STATES PATENTS

| | | |
|---|---|---|
| 2,157,867 | Robertson et al. | May 9, 1939 |
| 2,716,401 | Sietman | Aug. 30, 1955 |
| 2,761,438 | Niess | Sept. 4, 1956 |

UNITED STATES PATENT OFFICE

CERTIFICATE OF CORRECTION

Patent No. 2,906,255

September 29, 1959

Dean S. Bunce

It is hereby certified that error appears in the printed specification of the above numbered patent requiring correction and that the said Letters Patent should read as corrected below.

Column 2, line 5, after "head" insert -- 10 --; column 4, line 37, after "the" insert -- cylindrical --; line 39, strike out -- cylindrical --.

Signed and sealed this 5th day of April 1960.

(SEAL)
Attest:

KARL H. AXLINE
Attesting Officer

ROBERT C. WATSON
Commissioner of Patents